United States Patent [19]

Sturm

[11] Patent Number: 4,851,197

[45] Date of Patent: Jul. 25, 1989

[54] APPARATUS FOR THE CONTINUOUS REDUCTION OF SULPHUR-CONTAINING GASES

[75] Inventor: Werner Sturm, Bilkheim, Fed. Rep. of Germany

[73] Assignee: Steuler-Industriewerke GmbH, Hohr-Grenzhausen, Fed. Rep. of Germany

[21] Appl. No.: 7,526

[22] Filed: Jan. 28, 1987

[30] Foreign Application Priority Data

Feb. 14, 1986 [DE] Fed. Rep. of Germany ....... 3604750

[51] Int. Cl.⁴ ............................ B01J 8/04; F01N 3/10
[52] U.S. Cl. .................................. 422/171; 422/173; 422/191; 422/204
[58] Field of Search ............... 422/171, 173, 191, 193, 422/202–204, 148; 423/244 A, 569

[56] References Cited

U.S. PATENT DOCUMENTS

| | | | |
|---|---|---|---|
| 731,758 | 6/1903 | Daub | 422/203 |
| 2,230,467 | 2/1941 | Nelly, Jr. et al. | 422/171 |
| 2,600,425 | 6/1952 | Parry | 422/204 |
| 2,785,056 | 3/1957 | Thumm et al. | |
| 3,307,921 | 3/1967 | Junginger | 422/191 |
| 3,409,408 | 11/1968 | Ballestra | 422/202 |
| 3,653,833 | 4/1972 | Watson et al. | |
| 4,147,762 | 4/1979 | Steiner | 423/569 |

FOREIGN PATENT DOCUMENTS

| | | | |
|---|---|---|---|
| 92108 | 7/1981 | Japan | 423/244 A |
| 60-145901 | 8/1985 | Japan | 423/569 |

Primary Examiner—Benoit Castel
Attorney, Agent, or Firm—Bachman & LaPointe

[57] ABSTRACT

The present invention relates to an apparatus for the continuous reduction of sulphur-dioxide containing gases essentially free of molecular oxygen using coal or carbon. The apparatus comprises: a reactor filled with a reducing agent of coal or carbon having an upper portion, at least one middle portion and a lower portion, an outer reactor mantle and inner heat exchange regions; a pipe in the upper reactor portion for introducing preheated sulphur dioxide containing gases; spaced apart pipes for introducing hot gases into the outer reactor mantle and into the inner heat exchange regions; device(s) for controlling the hot gas flow in the reactor mantle and in the heat exchange regions so that the temperature in the reactor increases in each portion from the upper portion to the lower portion; and an outlet pipe arranged within the reactor for the reduced sulphur-containing gases.

4 Claims, 3 Drawing Sheets

4,851,197

APPARATUS FOR THE CONTINUOUS REDUCTION OF SULPHUR-CONTAINING GASES

INTRODUCTION

This invention relates to a method for the continuous reduction of sulphur dioxide-containing gases to sulphur and an apparatus for carrying out said method.

BACKGROUND OF THE INVENTION

During the combustion of sulphur-containing fuels, such as coal or fuel oil, in power plants, sulphur dioxide-containing gases, i.e. so-called flue gases, are formed. The $SO_2$ concentration in these flue gases is relatively low; for instance, if coal with a sulphur content of 1% is used, the $SO_2$ concentration is about 700 ppm. Due to the large installed power plant capacity however, the absolute $SO_2$ emission value is very high. For example, in a 600-MW-power plant on the basis of coal having a sulphur content of 1%; about $2\times 10^6$ flue gas is emitted per hour; this corresponds to an $SO_2$ amount of approximately 4 tons per hour (4t/h).

As a result of stricter environmental regulations, a variety of methods for the desulphurization of flue gases have been developed in the past few years and have also been employed in industrial countries. In the majority of the processes, the sulphur dioxide is ultimately converted into calcium sulphate (gypsum), part of which is disposed of as waste products, part of which is used in the building material industry. The use of said calcium sulphate in the building material industry, however, is limited on account of the demand in this field. The disposal of calcium sulphate is linked to the problem of environmental pollution. The hardness of the ground water in the vicinity of the disposal site increases significantly. What is more, as power plants are under compulsion to desulphurize flue gases, the amount of calcium sulphate will increase considerably during the coming years.

Furthermore, methods are known for the reduction of sulphur dioxide-containing gases to sulphur using coke (gas generator method) or of gases containing hydrogen, carbon monoxide, methane and other hydrocarbons; cf. Ullmanns Enzyklopadie der technischen Chemie, 4th edition, Vol. 21, 1982, page 24. One particular method of this kind is the $SO_2$ reduction in a modified Clausplant. This method is mainly used for the flue gas purification of $SO_2$ quantities above about 5t/h. The method has the disadvantage that large investments have to be made in the plants, that the handling of the method for the reduction of $SO_2$ is complicated and that it can hardly ever be used for small quantities of flue gas.

SUMMARY OF THE INVENTION

One object of the invention is to develop, an apparatus for the reduction of sulphur dioxide-containing gases to sulphur in which $SO_2$ quantities of up to 5t/h can be economically converted into sulphur. A further object of the invention is to provide an apparatus which is small in size, does not entail large investments or high working costs, is easy to handle and is not trouble-prone.

The way in which these objects are achieved is based on the following surprising finding. Essentially oxygen-free sulphur dioxide-containing gases, e.g. flue gases of a stripping column used in a physical purification process of flue gases, are introduced into a contact chamber or a reactor filled with coal or carbon suitable for the reduction of sulphur dioxide to sulphur. It was found that an almost complete reduction, i.e. a reduction of over 90% of sulphur dioxide to sulphur, is obtained if said contact chamber is divided into several temperature zones, with the temperature continuously increasing from about 150° C. to begion with to about 110° C. at the end in the direction of flow. At the same time, this measure ensures that the undesired precipitation of sulphur in the contact chamber is avoided. Contrary to the known three-step method for the reduction of sulphur dioxide to sulphur in the gas phase, the temperature gradient in the contact chamber is continuously increased, i.e. the inlet side of the sulphur dioxide-containing gases has a low temperature of about 150° to 200° C., whereas on the outlet side a temperature of about 900° to 1100° C. is maintained.

The invention thus relates to a method for continuously reducing sulphur dioxide-containing gases essentially free of molecular oxygen using either coal or carbon, characterized in that the sulphur dioxide-containing gases are introduced into a reactor which is divided into several temperature zones with the temperature continuously increasing in the direction of flow and which is filled with coal or carbon, with a temperature of about 150° to 200° C. in the inlet zone of the sulphur dioxide-containing gases, a temperature of 300° to 700° C. in a middle zone and a temperature of about 900° to 1100° C. in the outlet zone, and in that the sulphur is separated from the free sulphur-containing flue gases in a manner known per se.

The reactor is preferably divided into four temperature zones, the temperature of the first zone being maintained at 150° to 200° C., that of the second zone at 300° to 400° C., that of the third zone at 550° to 700° C. and that of the fourth zone at 900° to 1100° C. A temperature range of from 170° to 180° C. is most preferred in the first zone of the reactor, a range of from 330° to 370° C. most preferred in the second, a range of from 620° to 680° C. most preferred in the third and a range of from 950° to 1050° C. most preferred in the fourth.

The invention also relates to an apparatus for continuously carrying out the method for the reduction of sulphur dioxide-containing gases essentially free of molecular oxygen using either coal or carbon, said apparatus being characterised by the following features;

(a) a reactor filled with coal or carbon as a reducing agent;

(b) an inlet pipe in the upper portion of the reactor for the introduction of the pre-heated sulphur dioxide-containing gases;

(c) spaced apart pipes for the introduction of hot gases into an outer covering and inner heat exchange regions of the reactor in order to enable the division of the reactor into several temperature zones with the temperature continuously increasing in the direction of the flow of the sulphur dioxide-containing gases, the temperature in the inlet zone of the sulphur dioxide-containing gases being 150° to 200° C., that in a middle zone being 300° to 700° C. and that in the outlet zone of the sulphur-containing gases being 900° to 1100° C.;

(d) means for controlling the hot gas flow in a reactor mantle;

(e) an outlet pipe in the outlet zone, which has a temperature of 900° to 1100° C., for the removal of sulphur-containing gases from the outlet zone out of the reactor. The outlet pipe is preferably arranged in the center of the reactor.

Preferably the apparatus additionally comprises (f) a coal-feeding unit in the upper portion or top portion of the reactor and (g) an ash-outlet in the base of the reactor (h) and preferably one burner unit per zone for heating the heat exchange surfaces in the individual zones of the reactor.

Once the sulphur-containing gases have left the reactor via the outlet pipe, the sulphur is condensed out of the reduced flue gases in a manner known per se.

The contact chamber or the reactor in which the reduction of $SO_2$ to sulphur using either coal or carbon is carried out according to the method of the invention can generally have a cylindrical shape. Depending on the amount of sulphur dioxide-containing gases to be treated in one time unit, the reactor can be about 1 to 10 m high and have a diameter of about 50 to 2000 mm. However, the reactor can also have a square or rectangular cross section.

On the outside the reactor has a covering made of heat-resistant steel. At least in the high temperature zone of the reactor the lining can be made of a refractory material, preferably a conventional refractory acidic building material such as fire-clay, silica products or aluminium oxide-based products. The reactor is filled with the reducing agent on account of which the reduction of sulphur dioxide to sulphur takes place. The particle size of the reducing agent, i.e. of the coal or carbon, is not critical. The particle size only depends on the inner diameter of the reactor. The reducing agent used in the reduction process can either be continuously or discontinuously replaced by adding either coal or carbon into the top portion of the reactor. The spent reducing agent, i.e. the ash, is removed either continuously or discontinuously from the base of the reactor.

In order to control the temperature in the reactor, heat exchange surfaces or heating surfaces are arranged both outside of the reactor, i.e. in the mantle, and inside the reactor, i.e. in the bed of the reducing agent. They are preferably of a plate-shaped structure in the area of the bed of the reducing agent. They are preferably made of heat-resistant steel. These heat exchange surfaces are indirectly heated by means of hot gases heated to a temperature of at least 1100° C. as a result of, for instance, the combustion of heating gas or fuel oil. The heating is carried out from the outlet side of the sulphur-containing reduced gases to the inlet side of the sulphur dioxide-containing gases in a direction opposite to that of the flow of the sulphur dioxide-containing gases to be reduced. In small reactors it is also possible to electrically heat the heat exchange surfaces of the reactor. The heating of the heat exchange surfaces in the individual zones of the reactor is preferably carried out by one burner unit per zone.

The amount of sulphur dioxide-containing gases to be used during the reduction process can vary depending on the kind of fuel and the boiler load, i.e. the utilization degree of the power plant. The apparatus according to the invention can be operated on a very low flow rate of sulphur dioxide-containing gases up to the maximum possible charging.

BRIEF DESCRIPTION OF THE DRAWINGS

One example of an apparatus according to the invention will be illustrated in greater depth in the figures.

DESCRIPTION OF THE PREFERRED EMBODIMENTS

Figure 1:
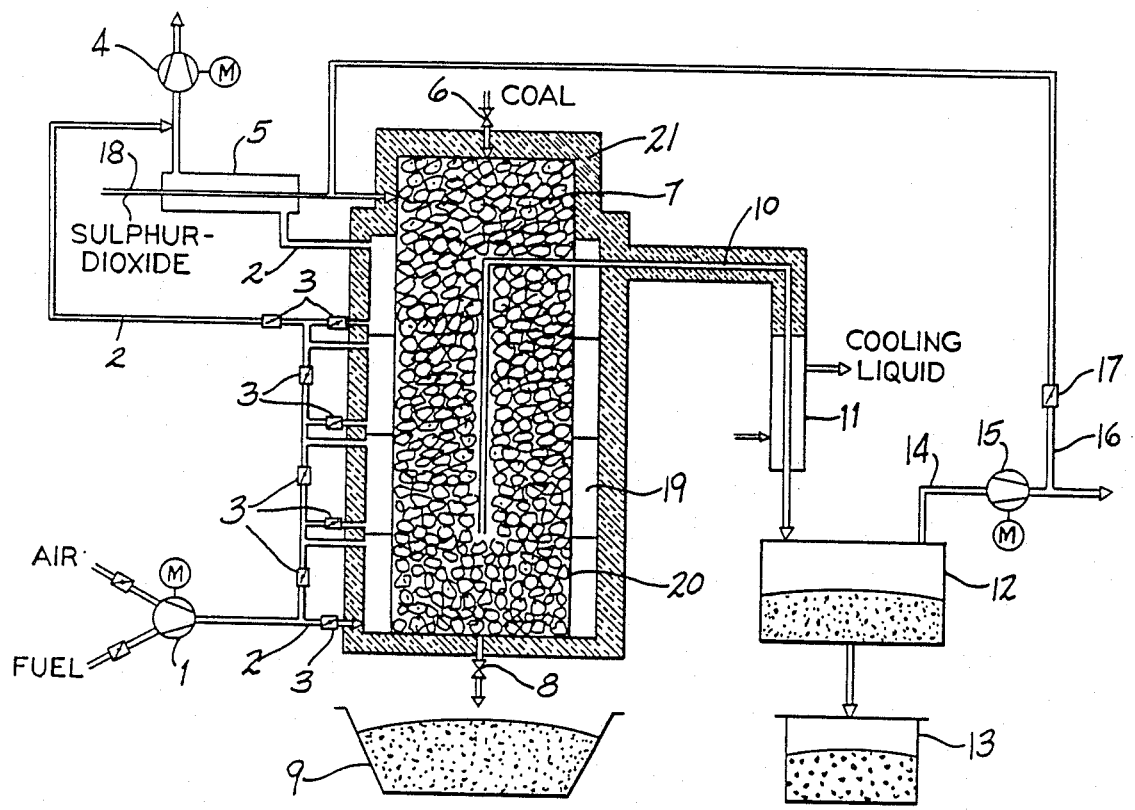
FIG. 1: is a schematic presentation of the entire apparatus in which sulphur dioxide-containing gases essentially free of molecular oxygen are reduced to sulphur. Once the gases have left the reactor, the sulphur vapour which has formed during the process is condensed and removed in the usual manner.

In FIG. 1, numeral 1 is the burning unit for the production of hot gases, 2 is the hot gas pipes with distributors, 3 is a means for controlling the temperature of the reactor in the various temperature zones, 4 is a blower for transporting the hot gases, 5 is a heat exchanger for heating the sulphur dioxide-containing gas charge, 6 is a coal-feeding unit, 7 is the coal-filled reactor, 8 is an ash outlet, 9 is an ash container, 10 is an outlet pipe for the sulphur-containing reduced gases, 11 is a cooler for the condensation of the sulphur out of the flue gases, 12 is a means for removing the sulphur, 13 is a sulphur container, 14 is an outlet pipe for the reacted gases which still contain a small amount of sulphur, 15 is a blower which transports the sulphur dioxide-containing and the sulphur-containing flue gases through the apparatus, 16 is a bypass pipe for the partial feedback of the reacted gases into the reactor, 17 is a means for controlling the bypass quantity, 18 is pipe for feeding the sulphur dioxide-containing gases essentially free of oxygen into the inlet side of the reactor, the temperature of which is kept low, 19 is the outer reactor mantle with hot gases for heating the reactor, 20 is the reactor mantle and 21 is the thermal insulation.

Figure 2:
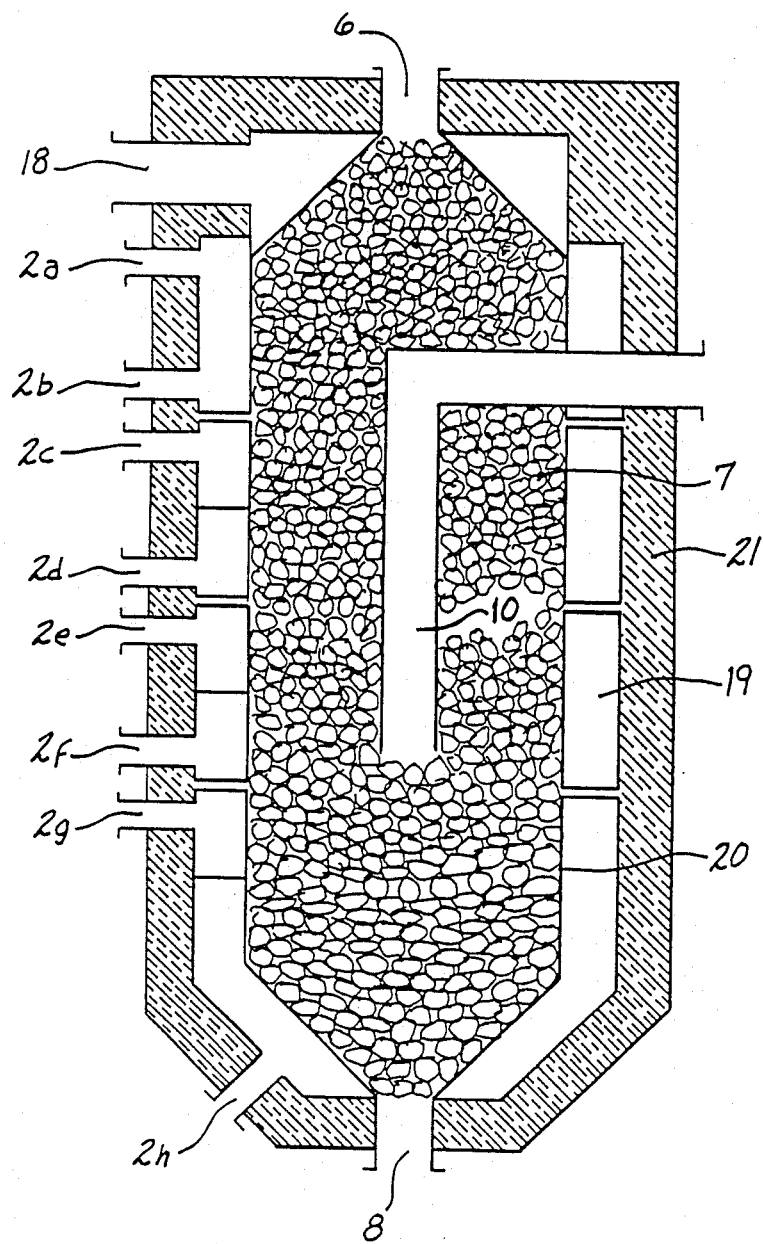
FIGS. 2 and 3: show the schematic structure of the reactor from a side view and a top view.

In FIG. 2, numerals 2a to 2h are the hot gas pipes which connect the distributors of the hot gas pipes 2 (FIG. 1) with the reactor 7, 6 is the coal-feeding unit, 7 is the coal-filled reactor, 8 is the ash outlet, 10 is the outlet pipe for the reacted sulphur-containing gases, 18 is the pipe for the feed of the sulphur dioxide-containing gases essentially free of oxygen, 19 is the outer reactor mantle with hot gases for heating the reactor, 20 is the reactor mantle and 21 is the thermal insulation.

Figure 3:
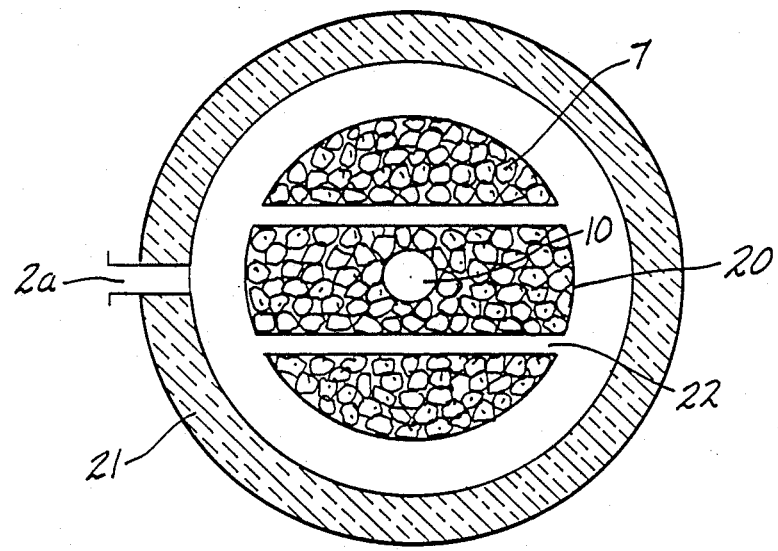

In FIG. 3, numeral 2a is a hot gas pipe, 7 is the coal-filled reactor, 10 is the outlet pipe for the reduced sulphur-containing gases, 20 is the reactor mantle, 21 is the thermal insulation and 22 is the inner heat exchange area.

Figure 4:
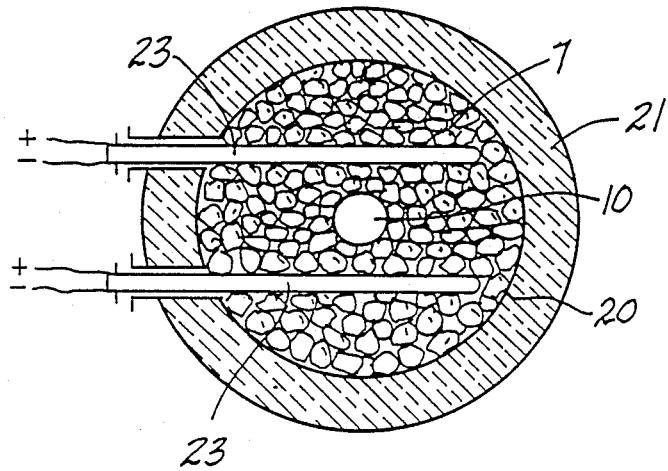
FIG. 4: shows an embodiment in which the reactor is electrically heated.

In FIG. 4, numeral 7 is the coal-filled reactor, 10 is the outlet pipe for the reduced sulphur-containing gases, 20 is the reactor mantle, 21 is the thermal insulation and 23 is the electric heating elements.

The method of the invention will be explained in greater depth by means of FIG. 1.

In the method according to the invention, the sulphur dioxide-containing gases which are essentially free of oxygen are introduced into the heat exchanger 5 via the flue gas pipe 18. In the heat exchanger 5, the sulphur dioxide-containing gases are indirectly pre-heated to about 150° to 200° C. by means of hot gases. Then the heated sulphur dioxide-containing gases reach the upper portion of the coal-filled or carbon-filled reactor 7. In the reactor 7, the sulphur dioxide-containing gases flow from the top of the coal filling to the bottom. The reducing agent can be either carbon or coal, for instance in the form of coke, mineral coal, active coal or charcoal. Brown coal (lignite) is a less suitable reducing agent. The sulphur dioxide-containing gases are lead through the individual zones of the reactor 7. The temperature increases quite steadily from the inlet side of the sulphur dioxide-containing gases in the upper portion of the reactor to the lower portion of the reactor, i.e. from about 150° to 200° C. to about 900° to 1100° C. This leads to the sulphur dioxide-containing gases being heated to a final temperature of about 900° to 1100° C. in the lower portion of the reactor. In the individual zones, the reduction of sulphur dioxide to sulphur is carried out using carbon. If, for instance, the reactor 7 is divided into four temperature zones, said zones should preferably have the following temperatures (average values):

Zone 1: 170° to 180° C.
Zone 2: 330° to 370° C.
Zone 3: 620° to 680° C.
Zone 4: 950° to 1050° C.

These values are the average values in the individual zones, the passage from one zone to the next does not normally lead to a sharp increase in temperature, but to a continuous increase from the uppermost zone to the lowest zone. In other words, in the transition region between the individual zone, there are continuously increasing transition temperatures between the aforementioned values.

After passing through the lowest, very hot temperature zone, the sulphur-containing gases are removed from the reactor 7 via the pipe 10. Inside the reactor the flow direction of the gases in said pipe is from the bottom to the top of the reactor. As a result, the hot sulphur-containing gases give off most of their heat to the coal filling in the individual temperature zones. This in turn leads to a considerably saving of energy. FIG. 1 shows a pipe 10 which is arranged in the centre of the reactor in the bed of the reducing agent. Naturally several gas pipes 10 can be arranged in the reactor to remove the hot sulphur-containing gases from the bottom temperature zone out of the reactor in the manner illustrated in FIG. 1.

Once the sulphur-containing gases have been removed from the reactor 7 via the pipe 10, they reach a cooler 11, followed by a means 12 for the sulphur removal where the sulphur is condensed and removed in the usual way. The removed sulphur can then be transported in a sulphur-collecting basin 13.

The gases, which are essentially free of sulphur, flow from this sulphur removal means 12 through a pipe 14 into the blower 15 which follows. The blower serves the purpose of transporting the gases through the entire installation. After passing through the blower 15, part of the gas flow is fed back into the reactor inlet or the pipe 18 via the bypass pipe 16 and is then mixed with the pre-heated sulphur-dioxide-containing gases. This improves the effectiveness of the apparatus as a whole.

The amount of gas which flows through the bypass pipe 16 is controlled by means of a flap 17. The gas which is not fed back via the bypass pipe 16 is transported into an adsorption means (not shown) for final purification or into the combustion air, for instance the combustion air of a boiler.

The reducing agent (e.g. coke) spent during the reduction process in the reactor 7 is fed either continuously or discontinuously into the reactor 7 via the coal-feeding unit 6. The ash produced during the reduction process is removed either continuously or disontinuously from the reactor via the outlet 8 and fed into the ash container 9. From this container the ash is later removed.

In smaller apparatus, the heating of the reactor 7 can also be carried out by means of electric heating elements 23 arranged in the bed of the reducing agent in the individual temperature zones; see FIG. 4. The reactor 7 and the sulphur dioxide-containing gases are usually indirectly heated using hot gases. Via the combustion of a fuel such as fuel gas or fuel oil, the hot gases are produced in the burner 1 and are led to the outer reactor mantle 19 via the hot gas pipe 2.

In FIG. 1, the reactor mantle 19 is divided into four different regions which correspond to the temperature zones in the reactor 7.

The heating of the reactor filling and the sulphur dioxide-containing gases occurs via both the reactor mantle 20 of the reactor 7 and the inner heat exchange areas 22 shown in the FIG. 3 in the reactor 7. This leads to a uniform heating through the entire cross section of the reactor and to an improvement of the temperature setting in the individual zones.

The controlling of the temperatures zones in the reactor 7 occurs via the appropriate setting of the flaps 3. In order to overcome the loss of pressure when the hot gases flow through the individual heat exchange zones, a blower 4 is installed in the hot gas pipe 2.

In order to keep the radiation of the apparatus to an absolute minimum, the appropriate parts of the apparatus are provided with thermal insulation 21.

The invention will be described in greater depth in the following example. Said example is not intended to limit the scope of the invention.

EXAMPLE

The experiments concerning the reduction of practically oxygenfree sulphur dioxide-containing gases to sulphur by means of carbon were carried out under the following conditions in a pilot apparatus of the following dimensions:

| | |
|---|---|
| Inner diameter of the pipe | approx. 50 mm |
| Pipe length | approx. 800 mm |
| Pipe material | approx. stainless steel 3 mm thick |
| Filling material | coal pellets, 4 mm grain |
| Filling quantity | approx. 1 kg (approx. 1.2 liters) |
| Filling level | approx. 600 mm |
| Gas throughput | approx. 0.8 Nm$^3$/h |
| Direction of flow | from top to bottom |
| Inlet temperature | approx. 150 to 200° C. |
| Outlet temperature | approx. 1100° C. |
| Heating | hot gases |
| Volume load | 100 to 5000 h$^{-1}$ |

The sulphur dioxide-containing gases of the following composition were introduced into the top of the carbon pellet-filled reactor and were led from the top to the bottom of the reactor through the individual temperature zones.

The temperatures in the individual zones were as follows (average values):

| | normal region | preferred region | most preferred region |
|---|---|---|---|
| 1st zone | 150–200° C. | 170–180° C. | 175° C. |
| 2nd zone | 300–400° C. | 330–370° C. | 350° C. |
| 3rd zone | 550–700° C. | 620–680° C. | 650° C. |
| 4th zone | 900–1100° C. | 950–1050° C. | 980° C. |

After passing through the reactor, the sulphur-containing gases were indirectly cooled with water in a cooling trap. As a result, most of the sulphur which had formed precipitated. To fully condense the sulphur, the gases were additionally led through a water-filled wash bottle. After passing through the wash bottle, part of the gases were transported back to the reactor inlet.

The following parameters were varied during the experiments:

| | |
|---|---|
| Sulphur dioxide content | 20 to 80% by volume |
| Carbon dioxide content | 5 to 60% by volume |
| Water content | 0 to 20% by volume |
| Bypass quantity | 0 to 80% by volume |

In this process, the carbon pellets wandered from the top of the reactor to the bottom in the same flow direction as the sulphur dioxide-containing gases.

The following results were obtained in the experiments:

EXPERIMENT A

A Gas Composition of Front of the Reactor

30% of volume $SO_2$
60% of volume $CO_2$
10% of volume $H_2O$
effectiveness (degree of $SO_2$- precipitation) based on $SO_2$: approx. 94%

EXPERIMENT B

Gas Composition in Front of the Reactor

70% by volume $SO_2$
20% by volume $CO_2$
10% by volume $H_2O$
effectiveness, based on $SO_2$: approx. 95%

EXPERIMENT C

Gas Composition in Front of the Reactor

40% by volume $SO_2$
40% by volume $CO_2$
20% by volume $H_2O$
Effectiveness, based on $SO_2$: 93%

I claim:

1. An apparatus for the continuous reduction of sulphur dioxide containing gases essentially free of molecular oxygen using coal or carbon, which comprises:

a reactor having a continuous contact chamber filled with a reducing agent of coal or carbon, said reactor having an upper portion, at least one middle portion and a lower portion, an outer reactor mantle, and inner heat exchange regions;

a pipe in the upper portion of the reactor for introducing pre-heated sulphur dioxide-containing gases;

spaced apart pipes for introducing hot gases into said outer reactor mantle and into said inner heat exchange regions;

means for controlling the hot gas flow in the reactor mantle and in the heat exchange regions so that the temperature in the reactor is continuously increasing in each portion from the upper portion to the lower portion of the reactor, said controlling means being located within said spaced apart pipes;

said reactor being characterized by several temperature zones including an inlet zone formed by said upper portion, at least one middle zone, and an outlet zone formed by said lower portion;

said inlet zone having a temperature of 150°–250° C.;

said at least one middle zone having a temperature of 300°–700° C.;

said outlet zone having a temperature of 900°–1100° C.; and an outlet pipe for the reduced sulphur-containing gases located in the center of the reactor, the sulphur-containing gases entering a lower end of the outlet pipe arranged within the reactor and leaving the reactor adjacent said upper portion through an upper end of the outlet pipe.

2. An apparatus according to claim 1, wherein said reactor additionally comprises a coal-feeding unit in said upper portion and an ash outlet in said lower portion.

3. An apparatus according to claim 1 wherein said reactor has four temperature zones with the temperature of the inlet zone being maintained at 150°–250° C., the temperature of a first middle zone being maintained at 300°–400° C., the temperature of a second middle zone being maintained at 550°–700° C. and the temperature of the outlet zone being maintained at 900°–1100° C.

4. An apparatus according to claim 1, wherein said spaced apart pipes communicate with one burner unit per zone for heating heat exchange surfaces in the zones of the reactor.

* * * * *